R. FLAGG.
DYNAMO ELECTRIC MACHINE.
APPLICATION FILED FEB. 1, 1909.

946,212.

Patented Jan. 11, 1910.

Witnesses
L. L. Mead.
W. A. Alexander.

Inventor
Ray Flagg
By his Attorneys
Fowler & Huffman

UNITED STATES PATENT OFFICE.

RAY FLAGG, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

DYNAMO-ELECTRIC MACHINE.

946,212.  Specification of Letters Patent.  Patented Jan. 11, 1910.

Application filed February 1, 1909. Serial No. 475,502.

*To all whom it may concern:*

Be it known that I, RAY FLAGG, a citizen of the United States, residing at the city of St. Louis, in the State of Missouri, have invented a certain new and useful Dynamo-Electric Machine, of which the following is a full, clear, and exact description, such as will enable any one skilled in the art to which it appertains to make and use the same, reference being had to the accompanying drawings, forming part of this specification.

My invention relates to dynamo electric machines, and more particularly to the means for supporting the ends of the winding in the field magnets of machines of large size.

In dynamo electric machines of large size the coils forming the winding of the field necessarily project some distance from the core and, owing to their great weight and the softness of the metal of which they are composed, some means must be provided to support them or they will sag and come in contact with the revolving part of the machine. Heretofore, as far as I am aware, such coils have always been supported by a rigid support being held against said support either by a second rigid support or by a winding of rope or cord. In either case, however, the resultant support has been rigid so that all the vibrations of the machine, or practically all the vibrations, are transmitted to the winding.

The object of my invention is to provide a flexible support for the ends of the coils so as to reduce the amount of vibration transmitted to them to a minimum.

Figure 1:
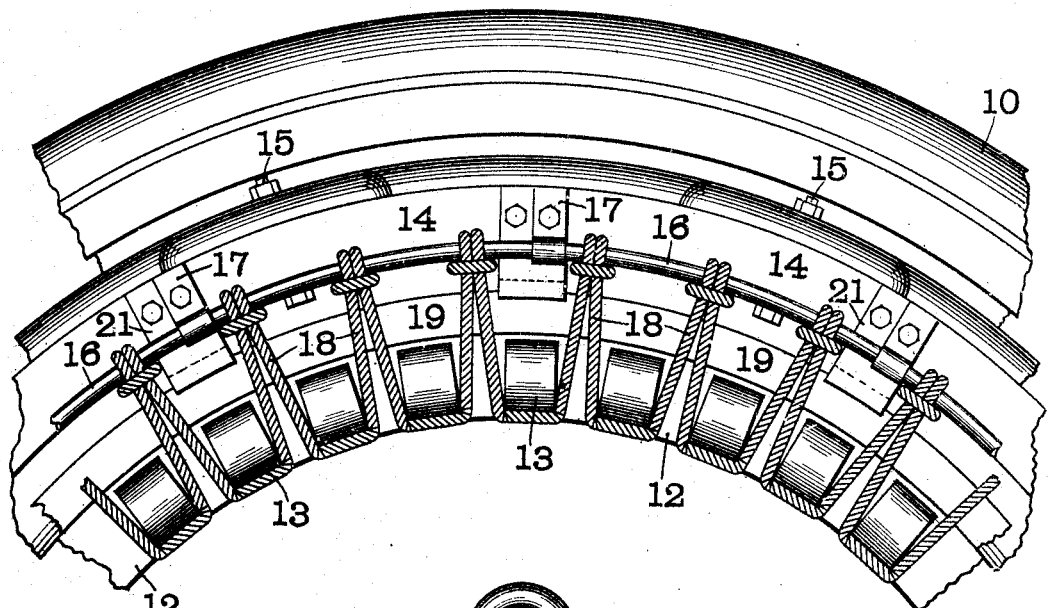
Figure 2:
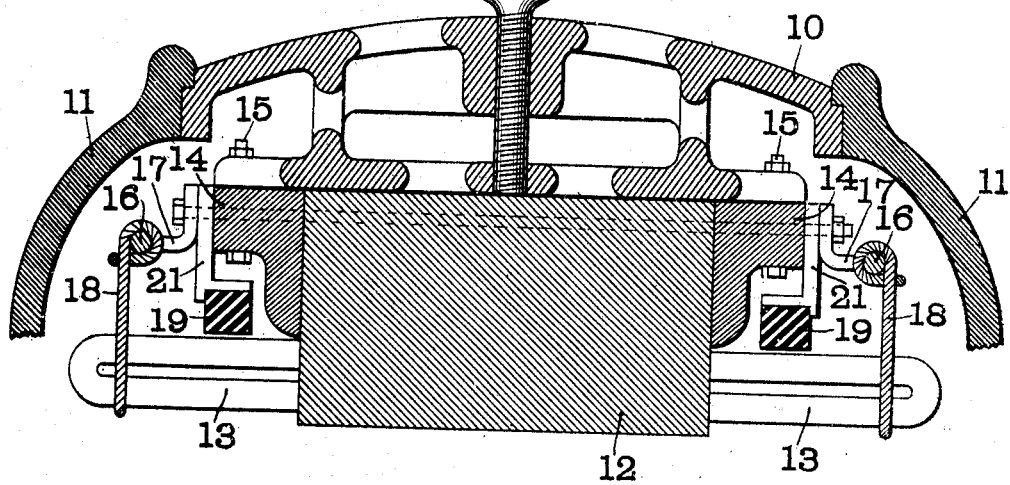

In the accompanying drawings, which illustrate one form of machine made in accordance with my invention, Figure 1 is a side elevation of a portion of the machine, the end cap being removed and Fig. 2 is a vertical central section.

Like marks of reference refer to similar parts in both views of the drawings.

10 represents the body of the casing or housing of the machine. This main housing or casing 10 is provided with a pair of end caps 11 in the usual manner. Carried by the housing 10 is the field core 12 in which is seated the coils 13 forming the field winding of the machine. The core 12 is held in place by clamping rings 14 secured to the housing 10 by bolts 15.

In order to support the ends of the coils 13, I provide, at each side of the core 12, an anchoring member 16 preferably in the form of a ring. This anchoring member 16 is held by means of brackets 17 secured to the clamping rings 14. The anchoring members 16 are arranged at some distance from the ends of the coils 13 so that the rope or cord 18, which forms the flexible support for the said coils or winding, will not draw the winding against the rigid support but will support it in a flexible manner so that the vibration will not be transmitted. In addition to the flexible support 18, I prefer also to have an insulating distance piece 19 preferably made of wood. This distance piece 19 is annular in form and is placed at a slight distance from the coils 13 and also as far as possible from the supports 18. By having the distance piece 19 normally out of contact with the coils 13 it does not transmit any vibration thereto and by placing it as far as possible from the support 18 a flexible support will still be maintained if by any accident the coil 13 is drawn against the distance piece 19. These supports 19 are carried by brackets 21 secured to the clamping rings 14. It will be seen that by this construction the coils are so supported that they cannot sag or come in contact with the revolving parts of the machine and at the same time they are so supported that few, if any vibrations of the machine are transmitted to the coil.

By the term flexible support as used in the specification and claims, I wish to be understood as designating some substance similar to rope which offers practically no resistance to lateral bending.

Having fully described my invention, what I claim as new and desire to secure by Letters Patent of the United States is:

1. In a dynamo electric machine, the combination with a core, of a winding projecting beyond said core, and a flexible support for the ends of said winding.

2. In a dynamo electric machine, the combination with a core, of a winding projecting beyond said core, a flexible support to limit the movement of said winding in one direction and an insulating distance piece for limiting the movement of said winding in the other direction.

3. In a dynamo electric machine, the combination with a core, of a winding projecting beyond said core, a flexible support to limit the movement of said winding in one direction, and an insulating distance piece for limiting the movement of said winding in the other direction, said distance piece being spaced laterally from said flexible support.

4. In a dynamo electric machine, the combination with a core, of a winding projecting beyond said core, a flexible support to limit the movement of said winding in one direction, and an insulating distance piece for limiting the movement of said winding in the other direction, said distance piece being spaced from said flexible support and normally out of contact with said winding.

5. In a dynamo electric machine, the combination with a core, of a winding projecting beyond said core, an anchoring member arranged at a distance from said winding, and rope or cord connections between the ends of said winding and said anchoring member whereby said winding is flexibly supported.

6. In a dynamo electric machine, the combination with a core, of a winding projecting beyond said core, an anchoring member arranged at a distance from said winding, rope or cord connections between said winding and anchoring member, and an insulating distance piece arranged between said rope connection and said core.

7. In a dynamo electric machine, the combination with a core, of a winding projecting beyond said core, an anchoring member arranged at a distance from said winding, rope or cord connections between said winding and anchoring member, and an insulating distance piece arranged between said rope connections and said core and normally out of contact with said winding.

In testimony whereof I have hereunto set my hand and affixed my seal in the presence of the two subscribing witnesses.

RAY FLAGG. [L. S.]

Witnesses:
  C. B. BENNETT,
  M. L. FRANKLIN.